United States Patent [19]

Nakamura et al.

[11] Patent Number: 4,470,073
[45] Date of Patent: Sep. 4, 1984

[54] FACSIMILE TRANSMITTER

[75] Inventors: Kozo Nakamura; Yasuyuki Kozima, both of Hitachi, Japan

[73] Assignee: Hitachi, Ltd., Tokyo, Japan

[21] Appl. No.: 428,978

[22] Filed: Sep. 30, 1982

Related U.S. Application Data

[63] Continuation of Ser. No. 72,914, Sep. 6, 1979.

[30] Foreign Application Priority Data

Sep. 7, 1978 [JP] Japan .................................. 53-109093

[51] Int. Cl.³ .............................................. H04N 7/12
[52] U.S. Cl. .................................................. 358/261
[58] Field of Search ......................... 358/260, 261, 263

[56] References Cited

U.S. PATENT DOCUMENTS 3,347,981 10/1967 Kagan et al. ......................... 358/261
3,723,641 3/1973 Heinrich et al. ..................... 358/261
4,101,934 7/1978 Fukuoka .............................. 358/261
4,193,097 3/1980 Kurahayashi et al. .............. 358/261
4,228,467 10/1980 de Loye et al. ...................... 358/261

Primary Examiner—Joseph A. Orsino, Jr.
Attorney, Agent, or Firm—Antonelli, Terry & Wands

[57] ABSTRACT

In a facsimile transmitter in which original document information to be transmitted is photoelectrically converted to an analog video signal which is binary-coded through a binary-coder to be stored in a buffer memory, and the stored information is read from the buffer memory to be sent to transmission lines the transmitter is further provided with a transition detector for detecting the transition point of the binary-coded video signal read from the buffer memory, a run length signal generator for counting the number of pulses of a clock signal until the transition point of the binary-coded video signal is detected thereby to generate a run length signal, and a small computer for effecting the redundancy suppressing process on the basis of the binary-coded video signal and the run length signal.

7 Claims, 4 Drawing Figures

FACSIMILE TRANSMITTER

This is a continuation of application Ser. No. 072,914 filed Sept. 6, 1979.

This invention relates generally to a facsimile transmitter and, more particularly, to a facsimile transmitter which has a function of suppressing the redundancy in information to be transmitted.

In the field of facsimile communication, one of the important problems is to reduce the time required for transmitting document information. In other words, this means reduction of the transmission costs by efficiently using the communication lines. In order to realize this, there has been employed a method of reducing the transmission time in which the video signal obtained through document scanning is transmitted by suppressing the redundancy in the information to be transmitted. However, many different coding systems are used for suppressing redundancy and these different coding systems are incompatible with each other so that it is generally impossible to communicate information between two facsimiles using different coding systems. For this reason, there is a great demand for a facsimile to which many different coding systems may be applied. As such a type of facsimile, there is a facsimile in which a video signal is supplied to a program memory controller where the redundancy of the signal is suppressed. However, such a facsimile generally deals with a video signal of approximately 1000-2000 bits per one scanning line, and hence, in order to deal with such a video signal through the program memory controller, it is disadvantageously required for the program memory controller to be provided with a high speed data processing capability.

Accordingly, an object of the present invention is to provide a facsimile transmitter which allows the use of a small computer with a relatively low data processing speed for suppressing redundancy at a higher speed.

The present invention has features in that, in a facsimile transmitter in which original document information to be transmitted is photo-electrically converted to an analog video signal which is binary-coded through a binary coder to be stored in a buffer memory, and the stored information is read from the buffer memory to be sent to transmission lines; the transmitter is provided with a transition detector for detecting the transition point of the binary-coded video signal read from the buffer memory, a run length signal generator for counting the number of clock pulses before detection of the transition point of the binary-coded video signal thereby to generate a run length signal, and a small size computer for suppressing the redundancy according to the binary-coded video signal and the run length signal.

The above and other objects and advantages of the present invention will become clear from the following description with reference to the accompanying drawings, in which.

Figure 1:
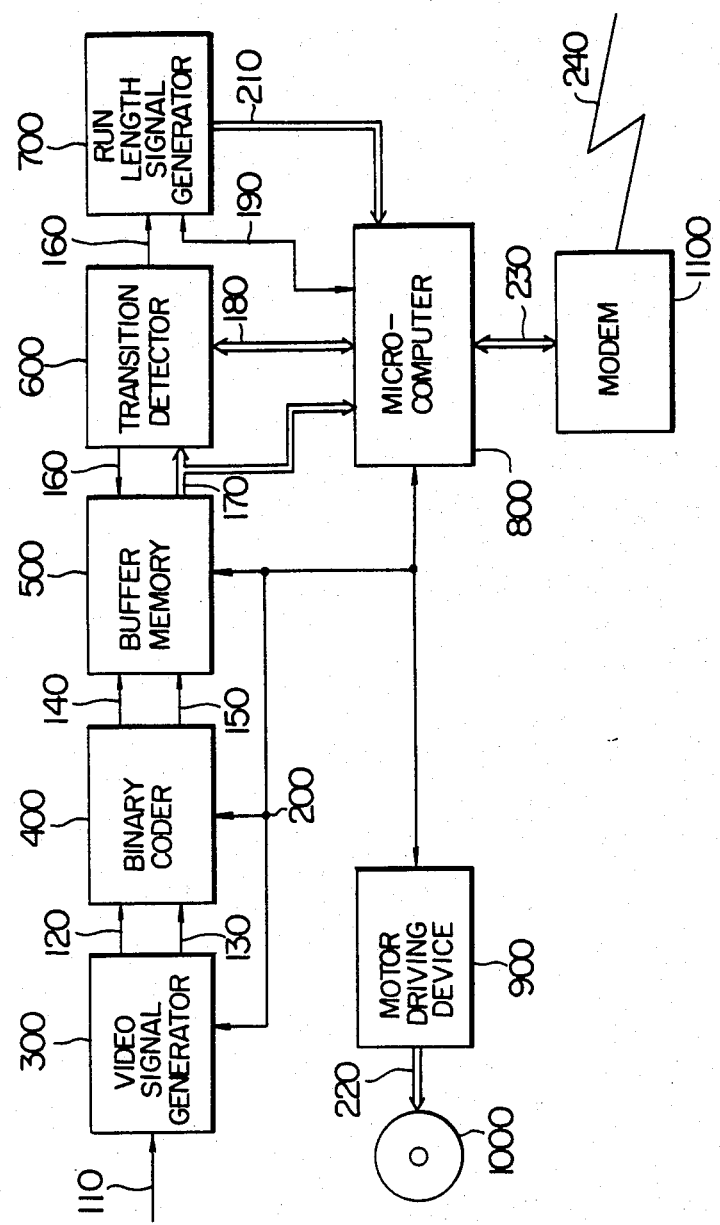
FIG. 1 is a circuit diagram of a facsimile transmitter according to the present invention.

Turning now to the drawings, there is shown in FIG. 1 a video signal generator 300 which photo-electrically converts a light signal 110 indicating the bright and dark levels in point to point scanning of an original document to an analog video signal 130. The analog video signal 130 is supplied along with a write clock signal 120 serially to a binary-coder 400 which converts the analog video signal to a binary coded video signal 140. A buffer memory designated 500 serves to receive and store the binary-coded video signal 140 serially produced from the binary-coder 400 in synchronism with a write clock signal 150. A transition detector 600 receives the binary-coded video signal 170 from the buffer memory 500 in response to application of a read clock signal 160 to the buffer memory 500 and detects transition points of the video signal 170 where it changes from a high level to a low level and vice versa, respectively. During the period between the transition point from high to low level and the next transition point from low to high level, a run length signal generator 700 counts the clock signal 160 delivered from the transition detector 600 and outputs a run length signal 210. A small computer shown at 800 such as a microcomputer issues a scan command signal 200 to the video signal generator 300, the binary-coder 400, the buffer memory 500, and a motor driving device 900. The small computer 800 also receives the binary-coded video signal 170 and the run length signal 210 in order to suppress the redundancy of the binary-coded video signal. A control signal 180 is used to control the operation of the transition detector 600, and a clear signal 190 is applied to clear the count contents of the run length signal generator 700. The motor driving device 900 outputs a motor control signal 220 to control the rotation of a motor 1000 so as to feed out the document incrementally by a length covering one scanning line at a time. After being subjected to the redundancy suppression by the small computer 800, the video signal is applied as an information signal 230 to a modem 1100 which modulates the suppressed video signal and sends out it on a communication line 240 such as telephone lines.

Figure 2:
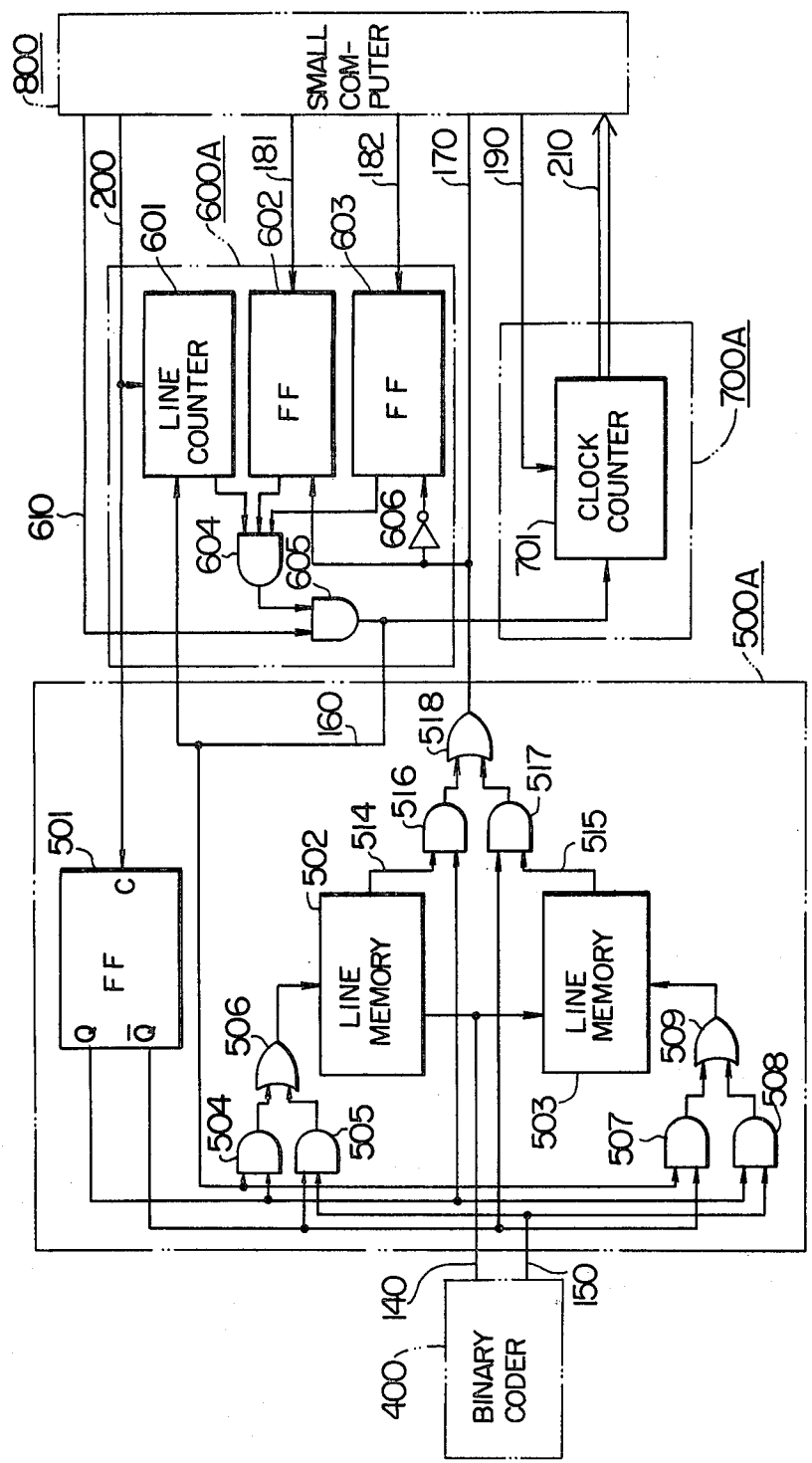
FIG. 2 is a circuit diagram of the buffer memory, transition detector and run length signal generator in one embodiment of the facsimile transmitter of FIG. 1.

Referring next to FIG. 2, there is shown a detailed circuit diagram of the buffer memory 500, the transition detector 600, and the run length signal generator 700. The embodiment shown in FIG. 2 is based on a redundancy suppressing system using a run length coding system of one scanning line mode. 500A is a buffer memory which corresponds to the buffer memory 500 in FIG. 1, 600A is a transition detector which corresponds to the detector 600 in FIG. 1, and 700A is a run length signal generator which corresponds to the run length signal generator 700 in FIG. 1.

In the buffer memory 500A, 501 is a flip-flop, 502 and 503 are line memories which may be composed of shift registers, 504 to 509 are input gates, 514 and 515 are the outputs of the line memories 502 and 503, and 516 to 518 are output gates. Further, in the transition detector 600A, 601 is a line counter, 602 and 603 are flip-flops, 604 to 606 are gates, and 610 is a clock signal. In the run length signal generator 700A, 701 is a clock counter. These lines 181 and 182 carry control signals from computer 800 for resetting the flip-flops 602 and 603.

In the buffer memory 500A, the flip-flop 501 and the gates 504 to 509 are provided to decide whether the write clock signal 150 or the read clock signal 160 is to be supplied to the line memories 502 and 503, which depends on the state of the flip-flop 501. In other words, the scan command signal 200 is applied to the clock terminal of the trigger-type flip-flop 501 each time for one line scanning thereby inverting the flip-flop 501 from one state to another, so that the write signal 150 and the read clock signal 160 are respectively applied to the line memories 502 and 503 and vice versa, alternately. One of the outputs 514 and 515 of the line memories 502 and 503 are selected through the flip-flop 501 and the gates 516 to 518 to be delivered as the video signal 170. For example, if the output Q of the flip-flop 501 is high and the output Q is low, the line memory 502 receives the read clock signal 160 through the gates 504 and 506 which operates the line memory in the read mode. The output signal 514 of the line memory 502, then, is delivered as the video signal 170 via the gates 516 and 518. On the other hand, the line memory 503 operates in the write mode under control of the write clock signal 150 applied thereto through the gates 508 and 509, thereby storing the video signal 140. Now, if the next scan command signal 200 is issued, the flip-flop 501 is inverted, whereby the line memories 502 and 503 go, respectively, to the write and read modes. Thus the buffer memory 500A delivers the video signal which corresponds to each one scanning line while it stores the video signal which corresponds to the next one scanning line, whereby the processing time is reduced significantly.

In the transition detector 600A, the binary-coded video signal 170 is used as a clock signal for the flip-flops 602 and 603, so that the transition point of the video signal 170 from a high level to a low level or vice versa causes one of the flip-flops 602 and 603 to invert to the state of the low level output. Low level of the output signal from one of the flip-flops 602 and 603 causes the gates 604 and 605 to be turned off, thereby stopping the generation of the read clock signal 160 produced according to the clock signal 610. In addition, when the counter 601 has counted the pulses of the clock signal 160 corresponding to one scanning line the output of the counter 601 goes low, thereby stopping the read clock signal 160. The counter 601 is reset by the scan command signal 200, when the operation is brought into the read mode for the next one scanning line.

In the run length signal generator 700A, the clock counter 701 is cleared by the clear signal 190 and thereby made ready for counting the pulses of the read clock signal 160 produced without interruption when the gates 604 and 605 are enabled and to output the result of the counting as the run length signal 210.

Therefore, the small computer 800 is only required to carry out the process for suppressing the redundancy on the basis of the video signal 170 and the run length signal 210, and hence it is unnecessary for the computer to have a capability of high speed processing.

Figure 3:
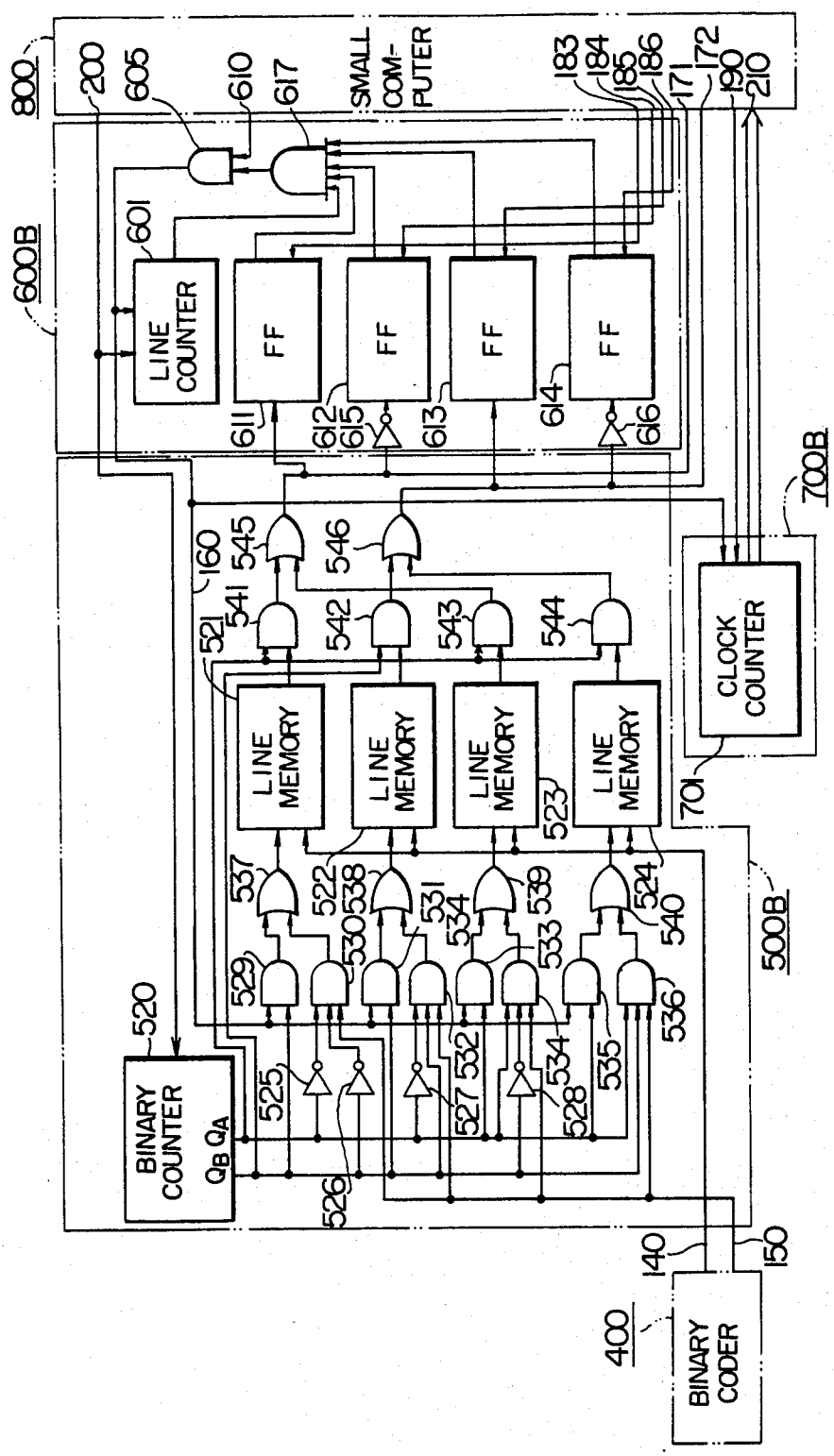
FIG. 3 is a circuit diagram of the buffer memory, transition detector and run length signal generator in another embodiment of the facsimile transmitter of FIG. 1.

In FIG. 3, there is shown a further embodiment of the buffer memory, the transition detector and the run length signal generator according to the present invention, in which the two scanning line batch coding system is employed. In the illustrated case, a buffer memory 500B corresponds to the buffer memory 500 in FIG. 1, a transition detector 600B corresponds to the buffer transition detector 600 in FIG. 1, and a run length signal generator 700B corresponds to the run length signal generator 700 in FIG. 1.

In the buffer memory 500B, 520 is a binary counter, 521 to 524 are line memories, 525 to 540 are input gates, and 541 to 546 are output gates.

In the transition detector 600B, 601 is a line counter, 605 and 615 to 617 are gates, 610 is a clock signal, 611 to 614 are flip-flops, and 183 to 186 are reset signals.

In the run length signal generator 700B, 701 is a clock counter.

In the above-mentioned arrangement, the binary counter 502 and the gates 525 to 540 in the buffer memory 500B serve to decide whether the write clock signal 150 or the read clock signal 160 is to be applied to the line memories 521 to 524. The outputs of the line memories 521 to 524 undergo selection through the gates 541 to 546 under control of the output of the binary counter 520 to form video signals 171 and 172.

The clock counter 701 in the run length signal generator 700B is the same as that in FIG. 2, and functions to count the pulses of the read clock signal 160 until either one of the transition points of the video signals 171 and 172 is detected.

It will be appreciated that, while the present invention has been described with reference to the illustrated embodiments of FIGS. 2 and 3 in which shift registers are used as the line memories, other types of memories such as random access memories may be properly used.

Figure 4:
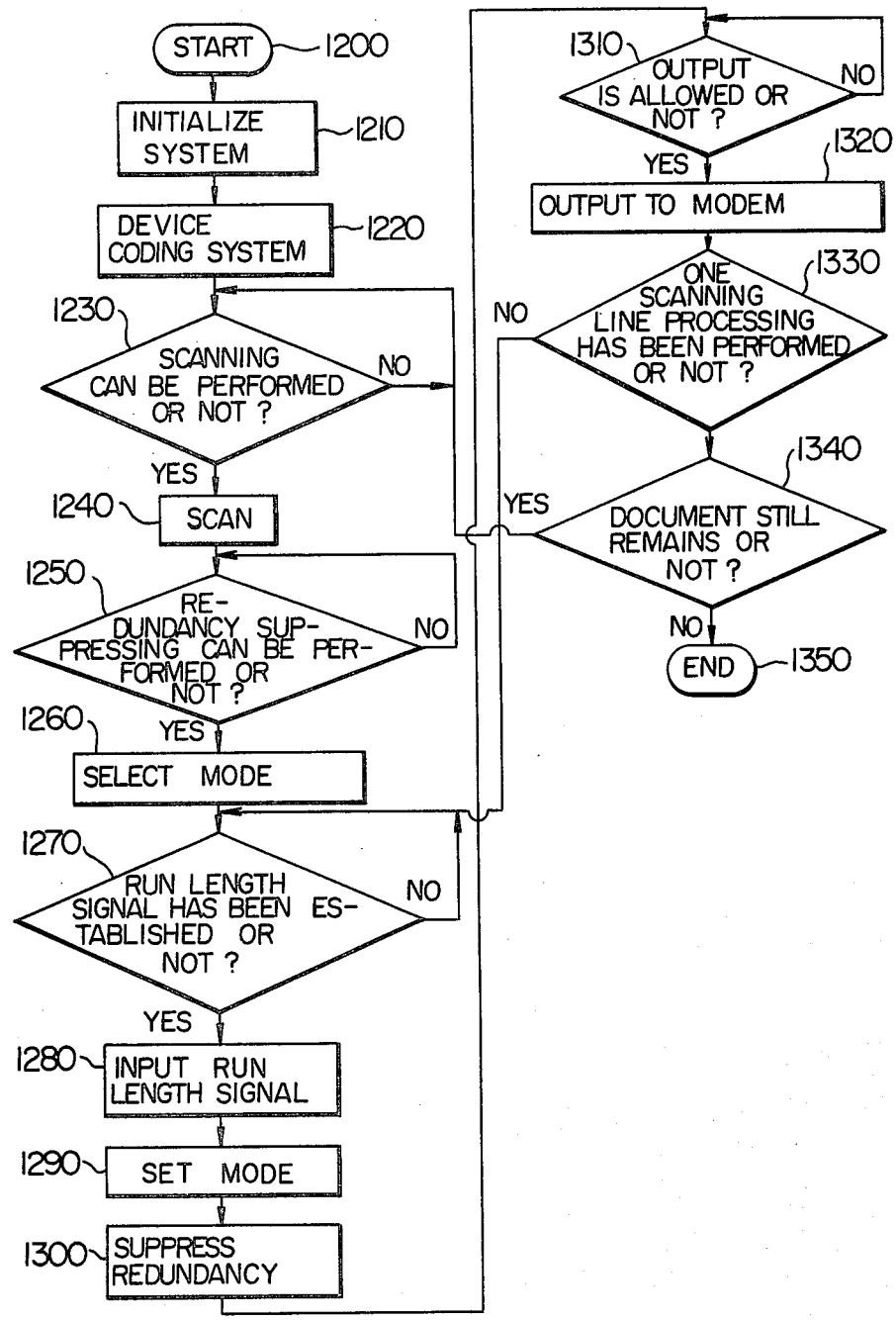
FIG. 4 is a flow chart of the process carried out by the small computer used in the facsimile transmitter of FIG. 1.

FIG. 4 shows an example of the control program to be executed by the small computer 800 in the facsimile transmitter according to the present invention, for the purpose of suppressing the redundancy effectively.

Now, the operation of the control program will be explained.

After starting with a START step 1200, a step 1210 is provided for initializing the small computer 800.

The program then proceeds to a step 1220 where the mode of the redundancy suppressing process is decided.

At a decision step 1230, the program decides whether or not the document can be scanned. If yes, the program passes to the next step.

That is, at an operation step 1240, the system issues a scan command signal 200 to the video signal generator 300, the digital converter 400, the buffer memory 500, and the motor driving mechanism 900 via the associated control lines.

Then, at a decision step 1250, the program decides whether or not to start coding. If yes, the program passes to a next operation step 1260.

In the operation step 1260, the program selects the mode, that is, whether the transition point from white to black or that from black to white is to be detected in the case of one line run length coding system.

Next, at a decision step 1270, the program decides whether or not the run length signal is established. If yes, the program passes to the next step.

That is, at an operation step 1280, the system supplies a run length signal to the small computer 800, and in order to generate the next run length signal at an operation step 1290, the system also resets the run length signal generator 700 and flip-flops 602 and 603 to change the mode.

At an operation step 1300, the suppression of the redundancy is carried out.

Then, the program decides at a decision step 1310 whether or not the codes resulting from the redundancy suppression can be sent to the modem 1100. If yes, the system sends the codes to the modem 1100 at a process step 1320.

At a decision step 1330, the program decides whether or not one scanning line has been processed. If no, the program returns to the decision step 1270 and repeats the above mentioned operation. If yes, the program passes to the next decision step 1340.

At the decision step 1340, the program decides whether or not the document to be scanned still remains. If yes, the program returns to the decision step 1230 and repeats the above mentioned operation. If no, the computer process terminates at an END step 1350.

With the arrangements as described, the present invention has remarkably practical effects in that even use of a small computer with relatively low processing speed allows the coding to be performed easily.

While the present invention has been described with reference to the preferred embodiments shown in the drawings, it should be understood that the invention is not limited to those embodiments but includes all other possible modifications, alterations and equivalent arrangements within the scope of appended claims.

What we claim is:

1. In a facsimile transmitter including video signal generator means for converting the bright and dark levels detected in point to point scanning of successive lines of a document to an analog video signal with scanning of the document in response to a scan command signal, binary-coding means for converting the analog video signal to a binary-coded video signal, a motor for feeding the document, motor driving means for driving said motor in response to said scan command signal, and means for supplying said scan command signal to said video signal generator and said motor driving means, an improvement which comprises:

buffer memory means for storing said binary-coded video signal obtained from said binary-coding means;

transition detector means for applying a read clock signal to said buffer memory means to read out said binary-coded video signal stored therein and for stopping the application of said read clock signal in response to detection of a change of said video signal from white to black or black to white levels;

run length signal generator means responsive to said transition detector means for counting the pulses of a clock signal produced until the level of said binary-coded video signal changes thereby to generate a run length signal;

computer means responsive to said run length signal generator means for effecting a redundancy suppressing process on said binary-coded video signal on the basis of said run length signal produced by said run length signal generator means and for converting said run length signal in accordance with a selected code into a run length code signal for transmission; and transmission means responsive to said computer means for effecting transmission of said run length code signal;

wherein said transition detector means includes first and second flip-flops connected to receive said binary coded video signal directly and through an inverter, respectively, as clock signals for controlling the states thereof, said flip-flops being connected to said computer means so as to be initially set to produce outputs at a first level, and gate means responsive to the outputs of said first and second flip-flops for passing clock signals to said run length signal generator means when both outputs of said flip-flops are at said first level.

2. A facsimile transmitter as defined in claim 1, in which said buffer memory means includes two line memories, and control means for controlling said line memories so that one stores a part of said binary-coded video signal obtained from said binary-coding means while the other line memory is being read out for delivering another part of said binary-coded video signal previously stored therein.

3. A facsimile transmitter according to claim 1, wherein the output of said gate means is connected to said buffer memory means so that said clock signals are applied to said buffer memory means as said read clock signal so long as said gate means is enabled.

4. A facsimile transmitter as defined in claim 3, in which said buffer memory means includes two line memories, and control means for controlling said line memories so that one stores a part of said binary-coded video signal obtained from said binary-coding means while the other line memory is being read out for delivering another part of said binary-coded video signal previously stored therein.

5. A facsimile transmitter according to claim 4, wherein said transition detector means further includes line counter means responsive to a line start signal from said computer means for applying a signal at said first level to said gate means to enable said gate means to pass said clock signal and for counting said clock signal to produce an output at a second level to block said gate means when the binary-coded video signal portion has been read out of one of said line memories.

6. A facsimile transmitter according to claim 5, wherein said line counter means is connected to the output of said gate means to receive said read clock signal as said clock signal.

7. A facsimile transmitter according to claim 5, wherein said control means includes a third flip-flop triggered by said line start signal and further gate means responsive to said third flip-flop for alternately switching said two line memories between read and write modes of operation.

* * * * *